United States Patent [19]

Spell

[11] Patent Number: 5,040,771

[45] Date of Patent: Aug. 20, 1991

[54] OVERLASH JIG

[75] Inventor: Louis T. Spell, Thonotosassa, Fla.

[73] Assignee: T.M.C. Cable Splicing, Inc., Palmetto, Fla.

[21] Appl. No.: 541,684

[22] Filed: Jun. 21, 1990

[51] Int. Cl.$^5$ .............................................. E21C 29/16
[52] U.S. Cl. ........................................ 254/134.3 CL
[58] Field of Search .............. 254/134.3 R, 134.3 PA, 254/134.3 CL; 24/115 R, 130

[56] References Cited

U.S. PATENT DOCUMENTS

| | | | |
|---|---|---|---|
| 2,663,544 | 12/1953 | Harley | 254/134.3 CL |
| 2,786,092 | 3/1957 | Gage | 254/134.3 PA |
| 2,953,349 | 9/1960 | Pfundt | 254/134.3 CL |
| 3,216,636 | 11/1965 | Kothe | 254/134.3 CL |
| 3,596,878 | 8/1971 | Parsen | 254/134.3 R |
| 3,672,636 | 6/1972 | Parsen | 254/134.3 R |

*Primary Examiner*—Robert C. Watson
*Attorney, Agent, or Firm*—Joseph C. Mason, Jr.; Ronald E. Smith

[57] ABSTRACT

An overlash jig that holds its position when it is detached from a vehicle during the time the tow rope is being routed around an obstacle. The jig includes a housing and a moveable block mounted for movement relative to the housing. A spring member pulls the block toward the housing so that when the tow rope is disconnected, the existing cable is tightly gripped between the block and the housing. When the towing resumes, the forward and downward pull generated by the towing vehicle moves the block away from the housing and rollers on the jig then facilitate its towing along the extent of the existing cable.

13 Claims, 4 Drawing Sheets

OVERLASH JIG

TECHNICAL FIELD

This invention relates, generally, to devices having utility in the pulling of cable of the type supported by utility poles. More particularly, it relates to a device that facilitates pulling such a cable past an obstacle.

BACKGROUND ART

Utility poles commonly support high voltage power lines, cable TV cables, and telephone wires. Typically, the poles are owned by a power company and the power company charges the other utility companies an annual fee for each pole connection. For example, a CATV company might pay to the power company that owns and maintains the poles a fee of $10.00 per year for each pole connection.

To avoid pole-connection expenses, it is a common practice to lash new cables to old cables already in position. Special tools are available that travel along the existing cable and play out a lashing wire that spirals around a new cable to lash it to the existing line as the new cable is pulled along the path of the existing line.

The new cable is pulled along the existing cable by a device known as an overlash jig. The jig includes a roller that rollingly engages the existing line. The jig is towed by a vehicle so it rolls along the existing line pulling the new wire at the same speed the vehicle is moving. The towing is accomplished by a rope that extends from the vehicle to the jig.

When an obstacle such as a utility pole, a tree limb or a mid-span drop is encountered, the vehicle is stopped and the towing rope is disconnected from the jig at the jig end thereof. An effort is then made to hold the new cable in position while the obstacle is circumvented. The free end of the tow rope is brought around, over or under the obstacle as conditions require and it is re-connected to the jig so that the vehicle can resume its forward travel, again towing the jig and hence pulling the new cable. When the re-connection has been made, the means holding the new cable into position is released.

The primary drawback of the above-described procedure is the lack of any suitable means for holding the new cable during the time the towing rope is released from the jig. If the new cable has been pulled a very short distance when the first obstacle is encountered, one person can simply hold the new cable during the re-positioning of the tow rope around the obstacle. However, once the new cable has been pulled over a considerable distance, its weight is such that it can no longer be manually held into position. Accordingly, inventors have developed numerous clamps designed to clamp the new cable to the old cable during the time the tow rope is disconnected.

The use of such clamps has two important shortcomings. First of all, their use is labor-intensive, i.e., it takes time to apply the clamps, and to remove them once the tow rope has been re-connected. Secondly, and even more seriously, the known clamps simply do not work well. The new cable, even when tightly clamped, will slip. The resultant slack will block driveways, intersections and the like. If the clamps are tightened more and more in an effort to stop the backward slipping and the resultant slack, the clamps will damage both the old and new cables.

As optical fibers become increasingly important, thousands of miles of cables containing such fibers are being strung. There has been instances where vehicles have struck sagging cables and destroyed many miles thereof. There is a need for a cable puller that eliminates the clamps of the prior art so that the slippage and sagging problem is overcome, but the prior art, taken as a whole, neither teaches nor suggests how an improved jig could be built.

DISCLOSURE OF INVENTION

The longstanding but heretofore unfulfilled need for a cable puller that obviates the need for clamps and which does not allow the pulled cable to sag during the time the tow rope is disconnected therefrom is now fulfilled by an overlash jig that is held open by the downward force exerted upon it during towing by the tow rope and which is closed by a bias means into effective clamping relation to the existing line when the tow rope is disconnected therefrom.

The clamping means includes a cushioned pad member that grippingly engages the existing line during the entire time the tow rope is disconnected from the jig and the grip achieved is so strong that no slippage and resultant sagging can occur in the pulled line. Upon re-connection of the tow rope, the bias is overcome and clamping means is released so that the jig again rollingly engages the existing line and the pulling continues until the next obstacle is encountered.

An important object of this invention is to facilitate the job of pulling cable along existing lines for subsequent lashing thereto.

Another object is to provide a self-clamping overlash jig.

These and other objects, advantages and features of the invention will become apparent as this description proceeds.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which.

BEST MODES FOR CARRYING OUT THE INVENTION

Figure 1:
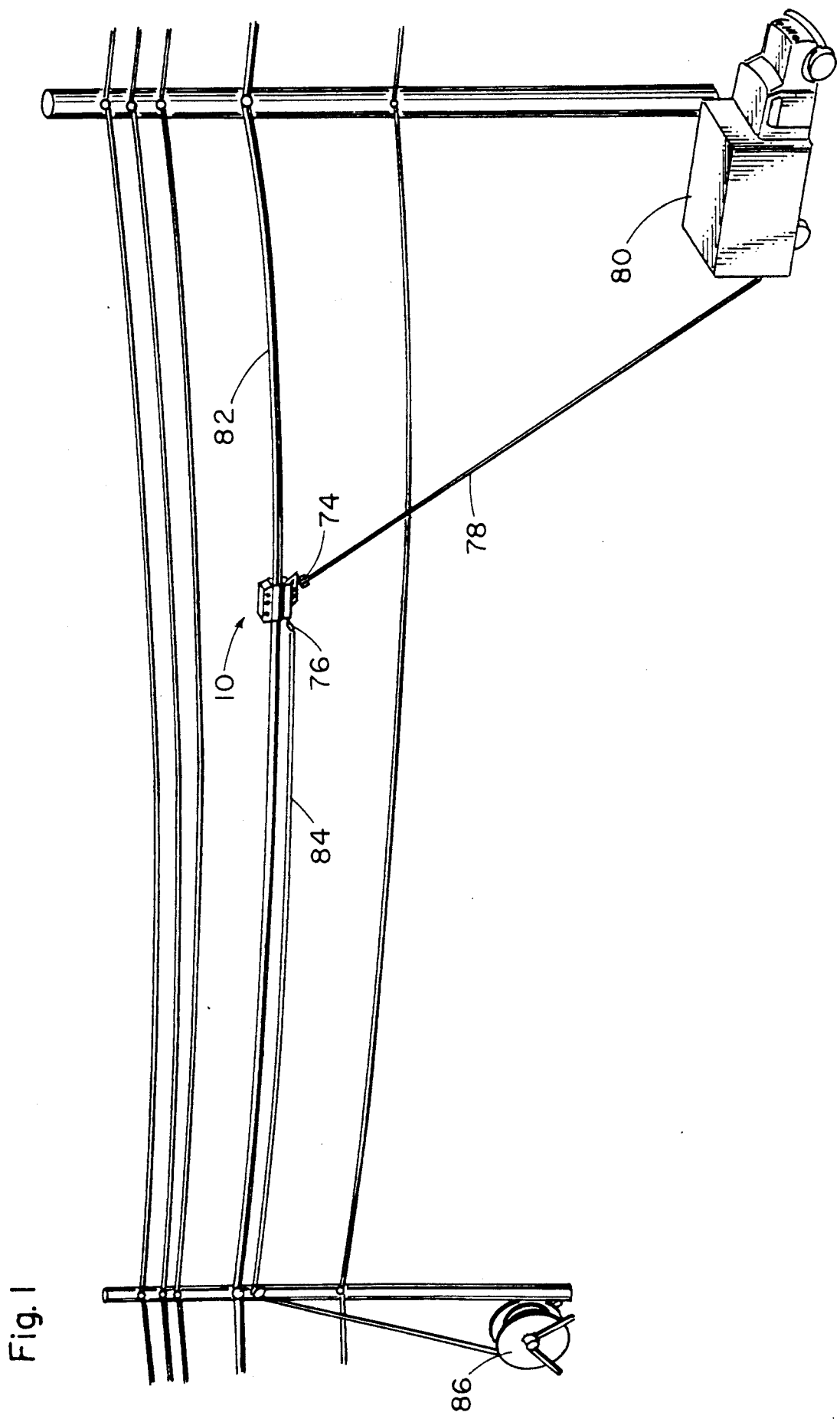
FIG. 1 is a perspective view showing the environment within which the present invention is used.

Referring now to FIG. 1, it will there be seen that an exemplary embodiment of the invention is denoted by the reference numeral 10 as a whole.

From FIG. 1 it is clear that the novel jig 10 is towed by a rope along the extent of a pre-existing cable to which it is to be lashed. However, before considering FIG. 1 is greater detail, reference should be made to FIGS. 2-7.

Jig 10 has six primary parts. The first part is an integrally formed housing 12 which includes top wall 14, sidewall 16, an open bottom 18, lower sidewall 20 and upper sidewall 22. Top wall 14 has a downwardly sloping front part denoted 15.

The second part is a moveably mounted block member denoted 24 as a whole. Block 24 includes top wall 26 and sidewalls 28,30. The forward and rearward ends of block 24 are open. Slots 32, 34, 36 are formed in each sidewall 28, 30 in laterally aligned relation to one another. Angle 38 is preferably about 150 degrees.

Figure 2:
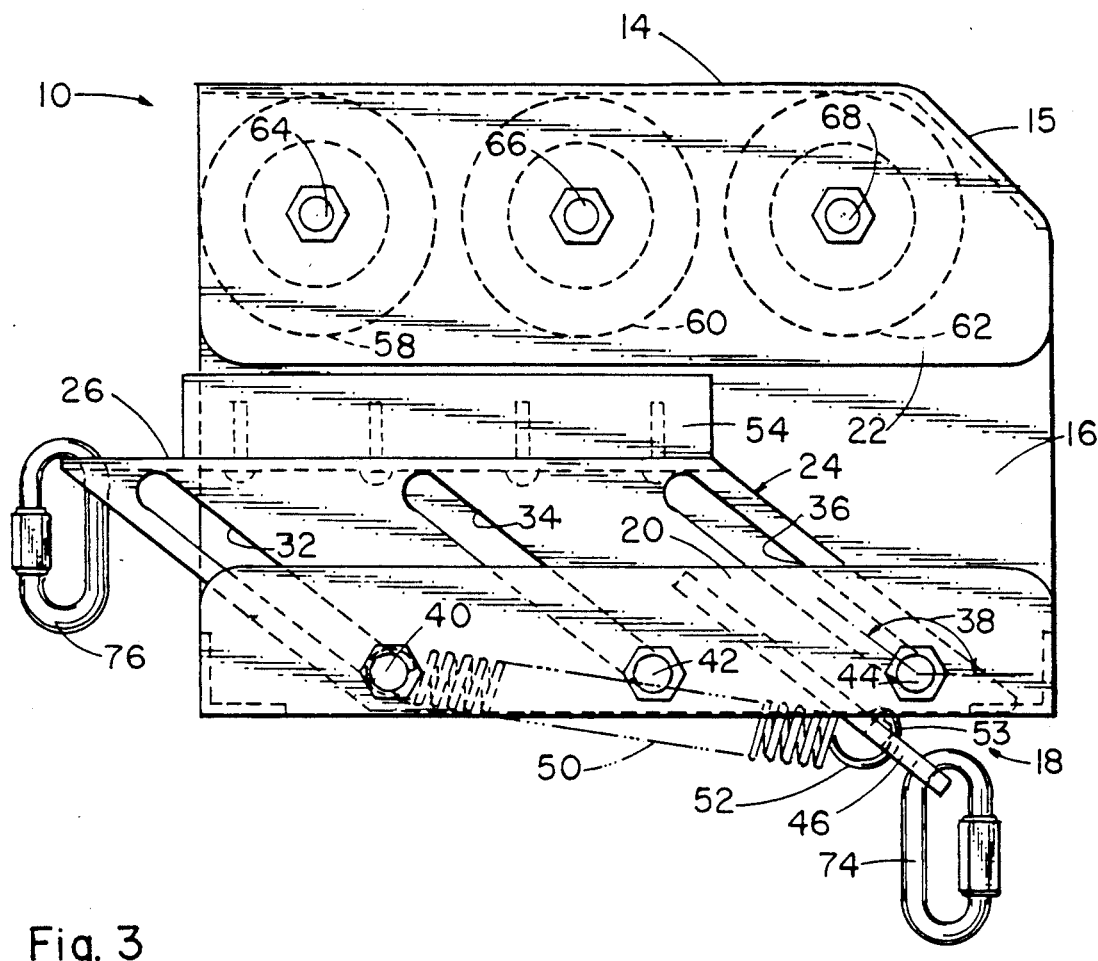
FIG. 2 is a side elevational view of an illustrative embodiment of the novel jig when it is in its retracted configuration.
Figure 3:
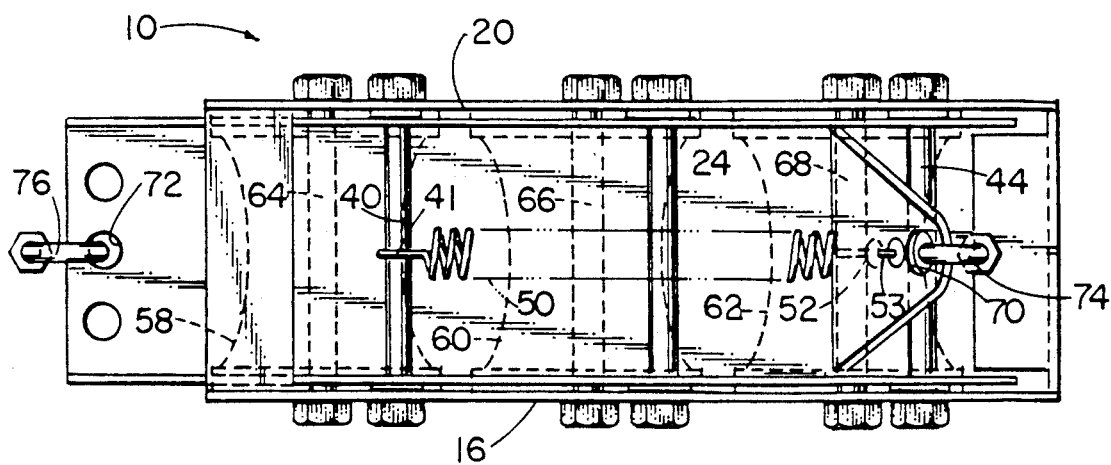
FIG. 3 is a bottom plan view of the jig in its retracted configuration.
Figure 4:
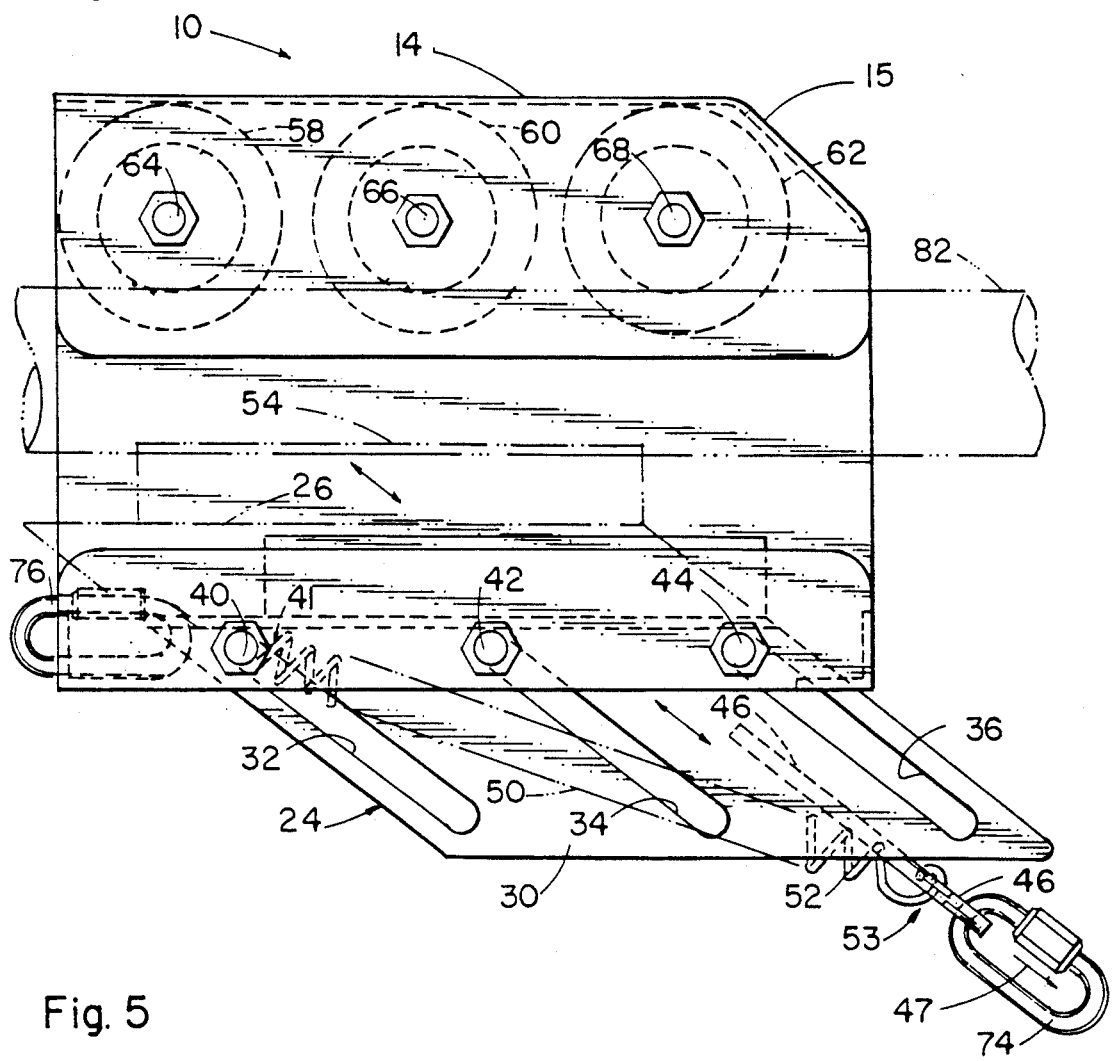
FIG. 4 is a side plan view thereof when it is in its extended configuration.
Figure 5:
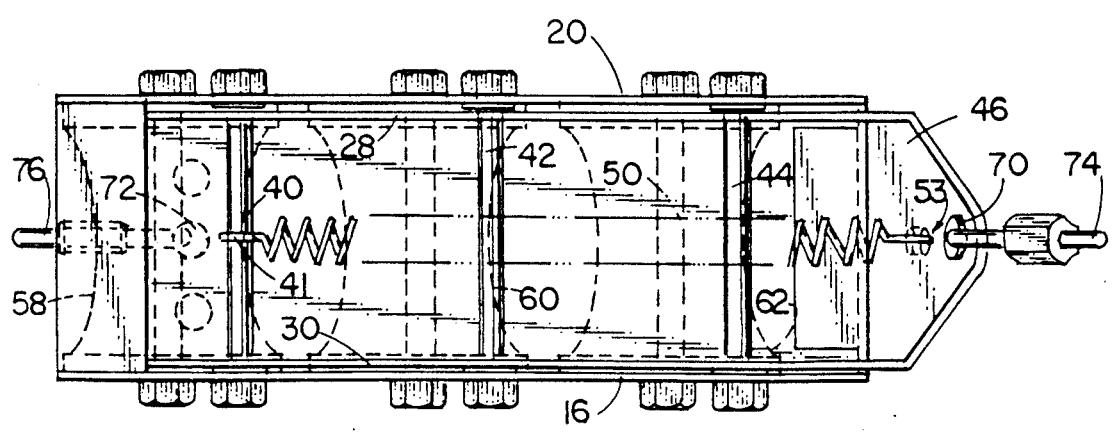
FIG. 5 is a bottom plan view thereof when in its extended position.
Figure 6:
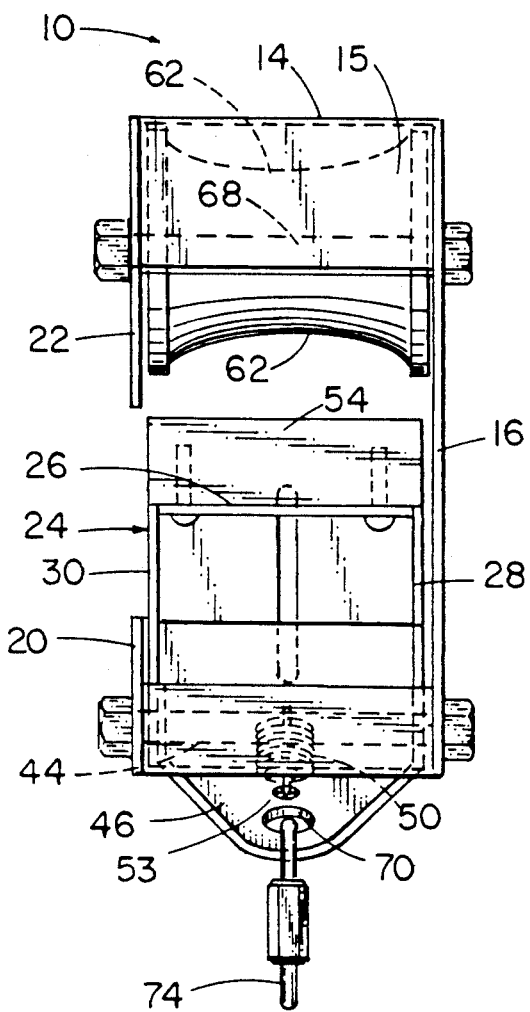
FIG. 6 is front elevational view when the jig is in its retracted configuration.

Block 24 is secured to housing 12 by plural transversely disposed rod members 40, 42, 44 which extend between a lower part of sidewall 16 and lower sidewall 20 of housing 12. The transverse extent of block 24 is slightly less than the transverse extent of housing 12 so that block 24 slidingly fits therewithin and is free to move relative thereto. Specifically, slots 32, 34, 36 are slideably mounted relative to rod members 40, 42, 44, respectively. The retracted position of block 24 relative to housing 12 is shown in FIGS. 2, 3 and 6 and its extended position is shown in FIGS. 1, 4, 5, and 7. Rods 40, 42, 44 serve as guide means to guide block 24 between its extreme positions.

The third primary part is a flat plate member 46 that is fixedly secured to block 24. Specifically, the opposite edges of the plate member 46 are welded or otherwise fixedly secured to the inner surfaces of sidewalls 28, 30 of block 24. Preferably, plate 46 is disposed in parallelism with slots 32, 34 and 36, i.e., it is disposed at a sixty degree angle relative to the vertical.

The fourth primary part is a bias means, preferably in the form of a spring member 50. Its leading end 52 is suitably secured to plate member 46 as at 53. Its trailing end is secured to trailing rod 40 as at 41. Since rod 40 is not moveably mounted, being secured at its opposite ends to housing walls 16 and 20, it should be clear that downward travel of plate 46 in the direction of arrow 47 (FIG. 4) is resisted by spring 50, and it should be equally clear that when no force is exerted in the direction of arrow 47, spring 50 pulls block 24 into its retracted position as depicted in FIGS. 2, 3 and 6.

The fifth primary part is cushioned pad 54 which is fixedly secured in overlying relation to block top wall 26. It may have a slightly concave top surface. Pad 54 is positioned as shown in opposing or confronting relation to the underside of rollers 58, 60, and 62. In a preferred embodiment, it is about eight inches in length and is coextensive with block top wall 26.

Rollers 58, 60, and 62 collectively comprise the sixth primary part of jig 10. They are rotatably mounted by axle members denoted 64, 66 and 68, respectively, that extend between sidewall 16 and upper sidewall 22 of housing 12.

An aperture 70 is formed at the leading end of plate 46 and a similar aperture 72 is formed at the trailing end of block 24 (FIG. 3). A first link member 74 is secured to leading aperture 70 and a second link member 76 is secured to trailing aperture 72.

A flexible tow rope 78 (FIG. 1) pulled by truck 80 is releasably secured to first link 74. Rollers 58, 60, 62 are placed into rolling engagement with an upper surface of existing cable 82, and the new cable 84 is secured to trailing link 76 and is unreeled from reel 86. The vehicle 80 proceeds forwardly in the direction of cable pulling, and the downward force exerted by tow rope 78 on plate 46 and hence block 24 pulls said block downwardly against the force of spring 50 as depicted in FIG. 1, and the new cable 84 is pulled along the extent of the preexisting cable 82 as desired for subsequent lashing thereto.

Figure 7:
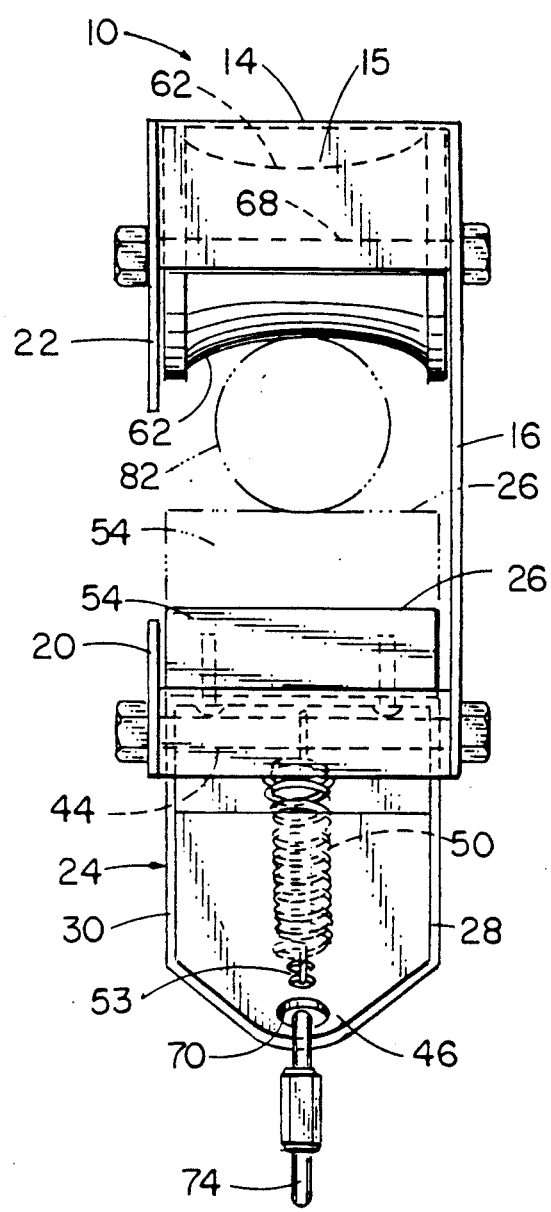
FIG. 7 is a front view thereof when in its extended configuration.

When an obstacle is encountered, rope 78 is released at its point of attachment to vehicle 80. It is not released from link 74; spring 50 immediately retracts block 24 and the preexisting cable 82 is tightly gripped between rollers 58, 60, 62 and cushioned pad 54 as depicted in FIG. 7 in dotted lines. The grip is so strong that the new cable will not drop back and sag during the time the tow rope is being routed around the obstacle and re-connected to the vehicle. The strength of the grip may perhaps best be understood by comparing FIG. 6 which shows the proximity of cushioned pad 54 and the underside of rollers 58, 60 and 62 when the jig 10 is in repose, and the relative positioning thereof when cable 82 is sandwiched therebetween as shown in FIG. 7.

Once the rope 78 and vehicle 80 are reconnected, vehicle 80 proceeds as before until the next obstacle is encountered, and so on. No independent clamps are ever used, and the new cable never slips. Just as importantly, the time previously spent on installing and removing clamps is saved. Productivity is thereby substantially increased.

This invention is clearly new and useful. Moreover, it was not obvious to those of ordinary skill in this art at the time it was made, in view of the prior art, considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An overlash jig having utility in pulling a new cable along the extent of a preexisting supported cable, comprising:

a housing member;

at least one rotatably mounted roller member being supported by said housing member;

said at least one roller member adapted to rollingly engage an upper surface of said supported cable;

a moveably mounted block member, said block member being moveably mounted relative to said housing member;

a cushioned pad member fixedly secured to and disposed in overlying relation to said block member;

a bias means for urging said block member and hence said pad member towards said at least one roller member;

said supported cable being tightly gripped and being sandwiched between said at least one roller member and said pad member when said jig is in response;

a plate member fixedly secured to said block member; and said plate member being adapted to engage a tow rope employed to pull said jig along the extent of said supported cable.

2. The jig of claim 1, further comprising at least one slot means formed in said block member and a rod member extending through said at least one slot means, said rod member being a guide means for said block member when it is moved relative to said housing.

3. The jig of claim 2, wherein said block member includes a pair of transversely opposed sidewall members and wherein said slot means includes at least a first pair of cooperatively, laterally aligned slot members formed in said sidewall members, said rod member having opposite ends slidably disposed within said opposing slot members, and opposite ends of said rod member being secured to said housing.

4. The jig of claim 3, further comprising a bias means having a leading end fixedly secured to said plate member and a trailing end secured to a predetermined part of said housing.

5. The jig of claim 4, wherein said preselected part of said housing is said rod member.

6. The jig of claim 5, wherein said at least one slot member is disposed substantially at a one hundred fifty degree angle.

7. An overlash jig, comprising:

a housing;

a plurality of roller members rotatably mounted to said housing;

said plurality of roller members being adapted to rollingly engage an upper surface of a cable means supported at longitudinal intervals by support means;

a block member that is movably mounted relative to said housing;

said block member having a retractable position where it is substantially fully retracted within said housing and an extended position where it is substantially extended therefrom;

a cushioned pad member disposed in overlying relation to said block member and in opposing relation to an underside to said plurality of roller members;

a bias means for urging said block and hence said pad member into close proximity to said plurality of roller members so that when said jig is in repose and said cable means is engaged by said plurality of roller members, said cable means is tightly sandwiched between said plurality of roller members and said pad member;

a plurality of transversely extending slot members being formed in said block member;

an equal plurality of rod members, each of said slot members having a rod member extending therethrough;

each of said rod members having opposite ends fixedly secured to said housing so that movement of said block member relative to said housing is guided by said rod members; and said plurality of slot members being collectively positioned at a common predetermined angular position so that said block member is displaced along said angular position when it is moved.

8. The jig of claim 7, further comprising a plate member fixedly secured to said block member at a leading and thereof, said plate member being adapted for engagement to a tow rope, and said plate member being angularly disposed at the same angular position as said slot members so that an external force imparted against said plate member pulls said block member into said extended position against said bias means.

9. The jig of claim 8, wherein said bias means has a leading end secured to said plate member and a trailing end secured to a preselected part of said housing.

10. The jig of claim 9, wherein said preselected part of said housing is a preselected rod member of said plurality of rod members.

11. The jig of claim 10, wherein the predetermined angular position of said plurality of slot members is one hundred fifty degrees.

12. The jig of claim 11, wherein said block member has a predetermined longitudinal extent and wherein said pad member is substantially coextensive therewith.

13. The jig of claim 12, wherein said predetermined longitudinal extent is about eight inches.

* * * * *